United States Patent
Lee et al.

(10) Patent No.: US 12,052,799 B2
(45) Date of Patent: Jul. 30, 2024

(54) USER TERMINAL HAVING A PLURALITY OF SUBSCRIBER IDENTITY MODULES

(71) Applicant: Samsung Electronics Co., Ltd., Suwon-si (KR)

(72) Inventors: Kyungwon Lee, Suwon-si (KR); Sanghyun Lee, Suwon-si (KR); Songkyu Kim, Suwon-si (KR); Minseok Shin, Suwon-si (KR); Inhye Yeom, Suwon-si (KR); Jungmin Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 17/538,233

(22) Filed: Nov. 30, 2021

(65) Prior Publication Data

US 2022/0141919 A1 May 5, 2022

Related U.S. Application Data

(63) Continuation of application No. PCT/KR2021/014835, filed on Oct. 21, 2021.

(30) Foreign Application Priority Data

Oct. 29, 2020 (KR) .......................... 10-2020-0142430

(51) Int. Cl.
*H04W 88/06* (2009.01)
*H04L 65/1016* (2022.01)
(Continued)

(52) U.S. Cl.
CPC ......... *H04W 88/06* (2013.01); *H04L 65/1016* (2013.01); *H04L 65/1104* (2022.05);
(Continued)

(58) Field of Classification Search
CPC ....... H04W 88/06; H04W 8/183; H04W 8/24; H04W 72/044; H04W 28/20;
(Continued)

(56) References Cited

U.S. PATENT DOCUMENTS

| 8,055,268 B2 | 11/2011 | Lee et al. |
| 10,623,946 B1 | 4/2020 | Kumar et al. |

(Continued)

FOREIGN PATENT DOCUMENTS

| KR | 10-2008-0051998 A | 6/2008 |
| KR | 10-2009-0022999 A | 3/2009 |

(Continued)

OTHER PUBLICATIONS

3rd Generation Partnership Project;Technical Specification 38.211 V15.4.0, Group Radio Access Network; NR; Physical channels and modulation, (Release 15), Dec. 2018.

(Continued)

*Primary Examiner* — Eugene Yun
(74) *Attorney, Agent, or Firm* — Jefferson IP Law, LLP

(57) ABSTRACT

A user equipment (UE) is provided. The UE includes a first subscriber identity module (SIM) configured to correspond to a first cellular network, a second SIM configured to correspond to a second cellular network, a wireless communication circuit, and a processor configured to determine a SIM to be used for Internet data communication among the first SIM and the second SIM as the first SIM, perform a connection process for Internet data communication and internet protocol (IP) multimedia subsystem (IMS) communication for a voice call with the first cellular network using first identification information about the first SIM, perform a connection process for the IMS communication with the second cellular network using second identification information about the second SIM, configure a parameter for the (Continued)

UE to support a narrow bandwidth for the second cellular network in UE capability information and transmit the UE capability information to the second cellular network.

20 Claims, 12 Drawing Sheets

(51) Int. Cl.
    *H04L 65/1104* (2022.01)
    *H04W 8/18* (2009.01)
    *H04W 8/24* (2009.01)
    *H04W 72/044* (2023.01)

(52) U.S. Cl.
    CPC ............ *H04W 8/183* (2013.01); *H04W 8/24* (2013.01); *H04W 72/044* (2013.01)

(58) Field of Classification Search
    CPC . H04W 52/02; H04W 76/16; H04W 52/0261; H04L 65/1016; H04L 65/1104; H04L 65/1059; H04L 65/1073; Y02D 30/70
    USPC ...................................................... 455/552.1
    See application file for complete search history.

(56) References Cited

U.S. PATENT DOCUMENTS

| | | |
|---|---|---|
| 2009/0059858 A1 | 3/2009 | Lee et al. |
| 2011/0305156 A1 | 12/2011 | Liu et al. |
| 2015/0094071 A1 | 4/2015 | Hang et al. |
| 2015/0237497 A1* | 8/2015 | Chen ..................... H04W 8/183 |
| | | 455/558 |
| 2015/0245309 A1 | 8/2015 | Nayak et al. |
| 2015/0358757 A1 | 12/2015 | Ford et al. |
| 2018/0084504 A1 | 3/2018 | Lindoff et al. |
| 2018/0132289 A1 | 5/2018 | Zhao et al. |
| 2019/0110236 A1 | 4/2019 | Huang et al. |
| 2019/0387559 A1 | 12/2019 | Zhou et al. |
| 2020/0008143 A1 | 1/2020 | Jain et al. |
| 2020/0037281 A1 | 1/2020 | Lee et al. |
| 2021/0120524 A1* | 4/2021 | Palle ................... H04W 68/005 |
| 2021/0227376 A1 | 7/2021 | Jha et al. |
| 2021/0352619 A1 | 11/2021 | Ryu et al. |
| 2022/0408518 A1* | 12/2022 | Bergström ............ H04W 76/30 |

FOREIGN PATENT DOCUMENTS

| | | |
|---|---|---|
| KR | 10-2013-0093522 A | 8/2013 |
| KR | 10-2017-0018014 A | 2/2017 |
| KR | 10-2020-0011137 A | 2/2020 |
| WO | 2015/130689 A1 | 9/2015 |
| WO | 2018/153487 A1 | 8/2018 |
| WO | 2020/045952 A1 | 3/2020 |
| WO | 2020/185949 A2 | 9/2020 |
| WO | 2020/197695 A1 | 10/2020 |

OTHER PUBLICATIONS

International Search Report and written opinion dated Jan. 20, 2022, issued in International Application No. PCT/KR2021/014835.
European Search Report dated Feb. 5, 2024; European Appln. No. 21886701.8-1216/4203605 PCT/KR2021014835.

* cited by examiner

USER TERMINAL HAVING A PLURALITY OF SUBSCRIBER IDENTITY MODULES

CROSS-REFERENCE TO RELATED APPLICATION(S)

This application is a continuation application, claiming priority under § 365(c), of an International Application No. PCT/KR2021/014835 filed on Oct. 21, 2021, which is based on and claims the benefit of a Korean patent application number 10-2020-0142430, filed on Oct. 29, 2020, in the Korean Intellectual Property Office, the disclosures of which are incorporated by reference herein in their entirety.

TECHNICAL FIELD

The disclosure relates to a user equipment (UE). More particularly, the disclosure relates to a UE capable of communicating with two or more cellular networks using two or more subscriber identity modules (SIMs) and a method for configuring a bandwidth for the UE.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" or a "Post long term evolution (LTE) System". The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed. A subscriber identity module (SIM) may store subscriber information about a user equipment (UE) used for wireless network communication. A UE may include one SIM but may include two or more SIMs to access wireless networks using a plurality of pieces of identification information using the respective SIMs.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

When a user equipment (UE) supports dual SIMs, the UE may connect to different cellular networks using identification information (e.g., a telephone number, an account, an identification (ID), or the like) of each subscriber identity module. The UE may use two SIM stacks for a voice call to establish a voice call connection to a plurality of cellular networks and may use only one SIM stack for Internet data communication.

Aspects of the disclosure are to address at least the above-mentioned problems and/or disadvantages and to provide at least the advantages described below. Accordingly, an aspect of the disclosure is to provide a UE capable of reducing power consumption due to wide-bandwidth cell monitoring by a UE using a plurality of subscriber identity modules in a SIM stack not used for Internet data communication.

Additional aspects will be set forth in part in the description which follows and, in part, will be apparent from the description, or may be learned by practice of the presented embodiments.

Solution to Problem

In accordance with an aspect of the disclosure, a user equipment (UE) is provided. The UE includes a first subscriber identity module configured to correspond to a first cellular network, a second subscriber identity module configured to correspond to a second cellular network, a wireless communication circuit, and a processor configured to be operatively connected to the first subscriber identity module, the second subscriber identity module, and the wireless communication circuit, wherein the processor may be configured to determine a subscriber identity module to be used for Internet data communication among the first subscriber identity module and the second subscriber identity module as the first subscriber identity module, perform a connection process for Internet data communication and internet protocol (IP) multimedia subsystem (IMS) communication for a voice call with the first cellular network through the wireless communication circuit using first identification information about the first subscriber identity module, and perform a connection process for the IMS communication with the second cellular network through the wireless communication circuit using second identification information about the second subscriber identity module, the processor being configured to configure a parameter for the UE to support a narrow bandwidth for the second cellular network in UE capability information based on criteria and to transmit the UE capability information to the second cellular network.

In accordance with another aspect of the disclosure, a bandwidth configuration method of a is provided. The UE includes a first subscriber identity module corresponding to a first cellular network and a second subscriber identity module corresponding to a second cellular network, and the method may include determining a subscriber identity module to be used for Internet data communication among the first subscriber identity module and the second subscriber identity module as the first subscriber identity module, performing a connection process for Internet data communication and IP multimedia subsystem communication for a voice call with the first cellular network using first identification information about the first subscriber identity module, and performing a connection process for the IMS communication with the second cellular network using second identification information about the second subscriber identity module, the method including configuring a parameter for the UE to support a narrow bandwidth for the second cellular network in UE capability information based on criteria and transmitting the UE capability information to the second cellular network.

Advantageous Effects of Invention

Various embodiments of the disclosure may provide a user equipment (UE) capable of reducing power consumption due to cell monitoring or the like by allowing the UE using a plurality of subscriber identity modules to access a network with a narrow bandwidth in a SIM stack not used for Internet data communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
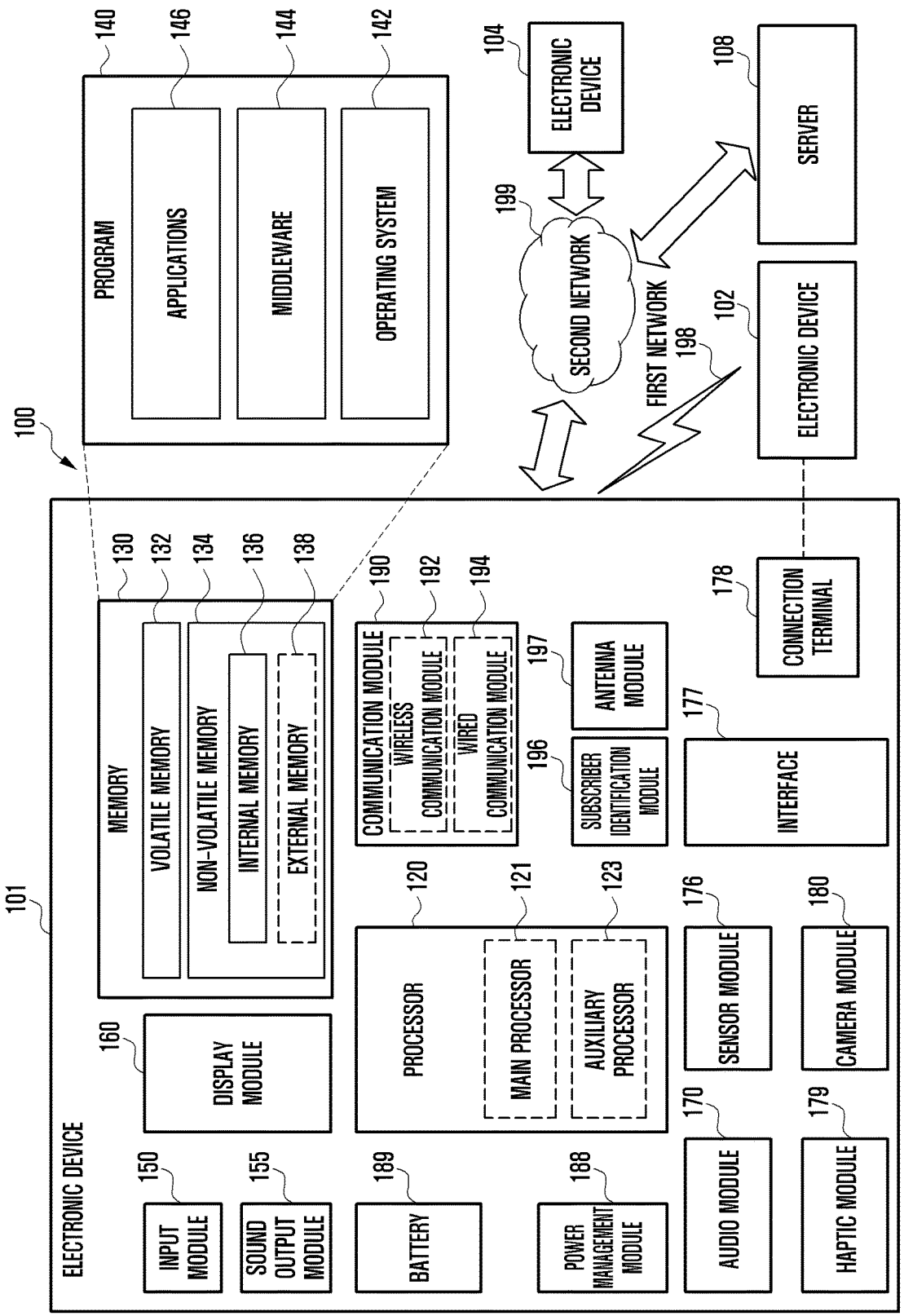
FIG. 1 is a block diagram illustrating an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. According to an embodiment, the electronic device 101 may access a plurality of cellular networks by using a plurality of (e.g., two) subscriber identification modules.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device 101 may operate as a user equipment (UE) of a cellular network (e.g., a 5G NR network). Hereinafter, features of a UE according to various embodiments will be described, and the following UE may include at least some of the components and/or functions of the electronic device of FIG. 1 and may also be referred to as an electronic device.

Figure 2:
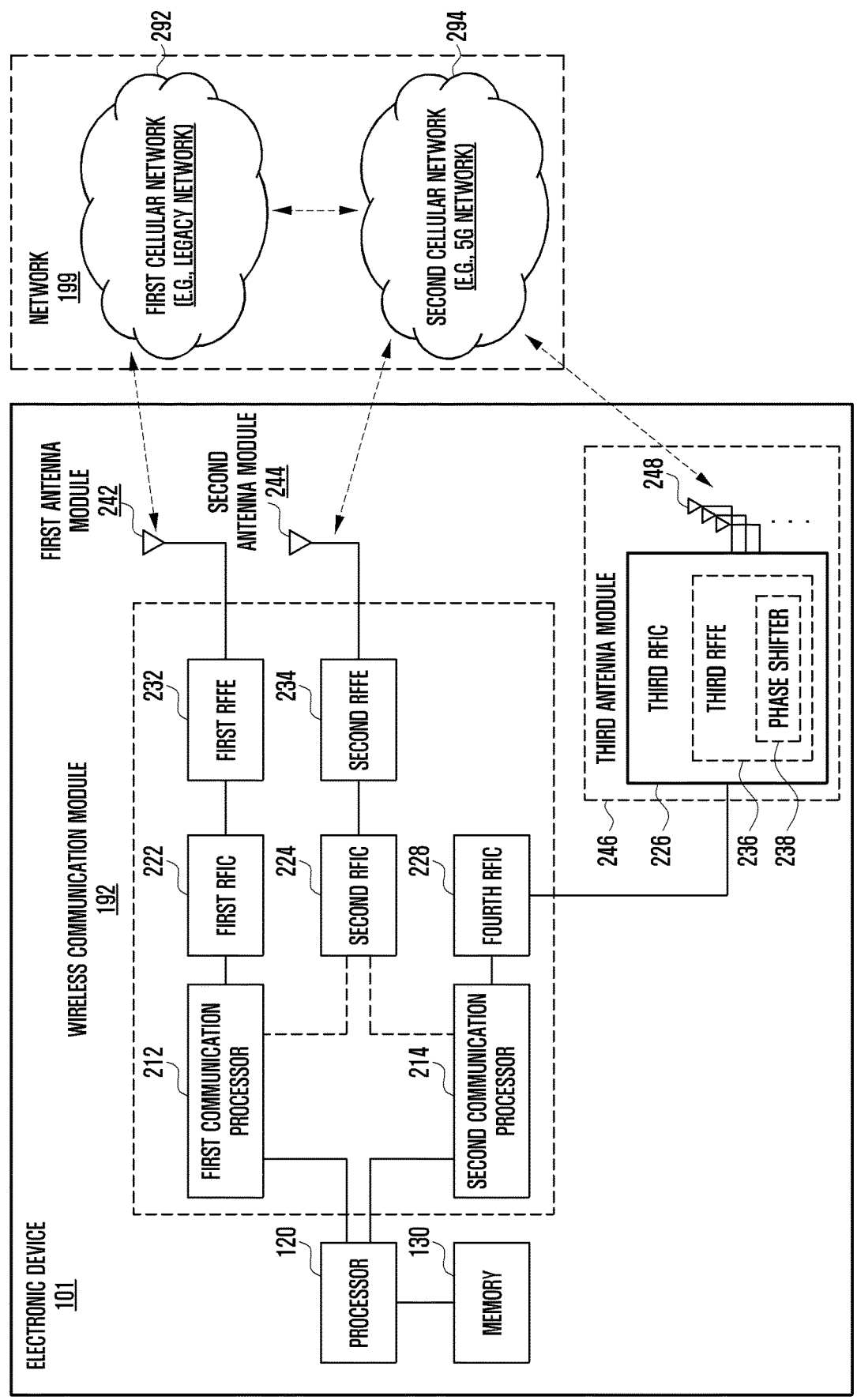
FIG. 2 is a block diagram illustrating an electronic device for supporting 4G network communication and 5G network communication according to an embodiment of the disclosure.

FIG. 2 is a block diagram illustrating an example electronic device supporting 4G network communication and 5G network communication according to an embodiment of the disclosure.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The second network 199 may include a first cellular network 292 and a second cellular network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first cellular network 292, and may support 4G network communication via the established communication channel According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second cellular network 294, and may support 5G network communication via the established communication channel. According to an embodiment, the second cellular network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second cellular network 294, and may support 5G network communication via the established communication channel According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the auxiliary processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first cellular network 292 (e.g., a 4G network). In the case of reception, an RF signal is obtained from the first cellular network 292 (e.g., a 4G network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second cellular network 294 (e.g., a 5G network). In the case of reception, a 5G Sub6 RF signal may be obtained from the second cellular network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second cellular network 294 (e.g., a 5G network). In the case of reception, a 5G Above6 RF signal is obtained from the second cellular network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second cellular network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second cellular network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second cellular network 294 (e.g., a 5G network) may operate independently (e.g., Standalone (SA)) from the first cellular network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
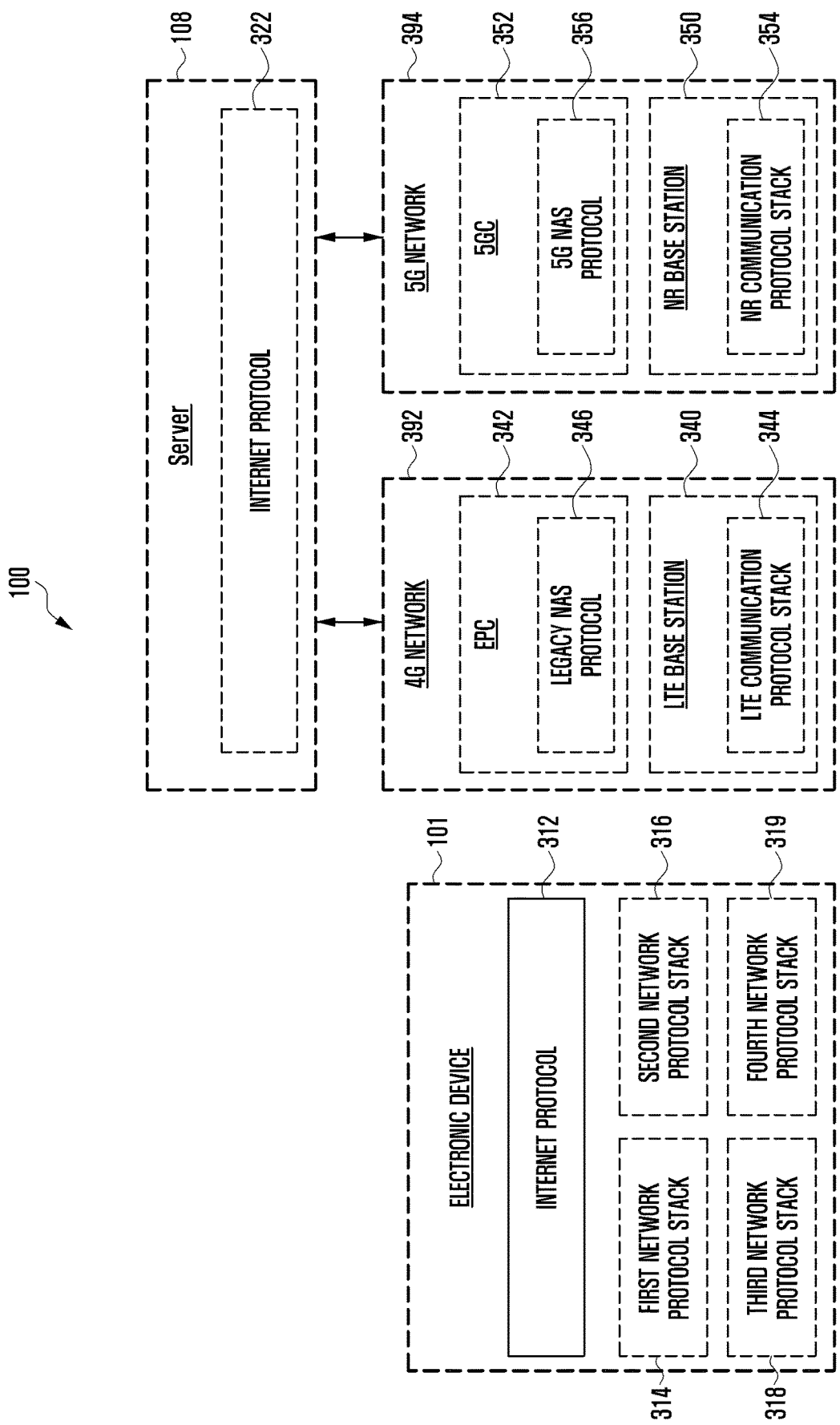
FIG. 3 illustrates a protocol stack structure of a 4G communication and/or 5G communication network according to an embodiment of the disclosure.

FIG. 3 is a diagram illustrating a protocol stack structure of a network of 4G communication and/or 5G communication according to an embodiment of the disclosure.

Referring to FIG. 3, the network environment 100 according to various embodiments may include the electronic device 101, a 4G network 392, a 5G network 394, and the server 108.

According to various embodiments, the electronic device 101 may include an Internet protocol 312, a first communication protocol stack 314, a second communication protocol stack 316, a third communication protocol stack 318, and a fourth communication protocol stack 319. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to an embodiment, the electronic device 101 may perform wireless communication with the 4G network 392 using the first communication protocol stack 314. According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a legacy non-access stratum (NAS) protocol 346. The 4G network 392 may perform LTE wireless communication with the electronic device 101 using the LTE communication protocol stack 344 and the legacy NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4A:
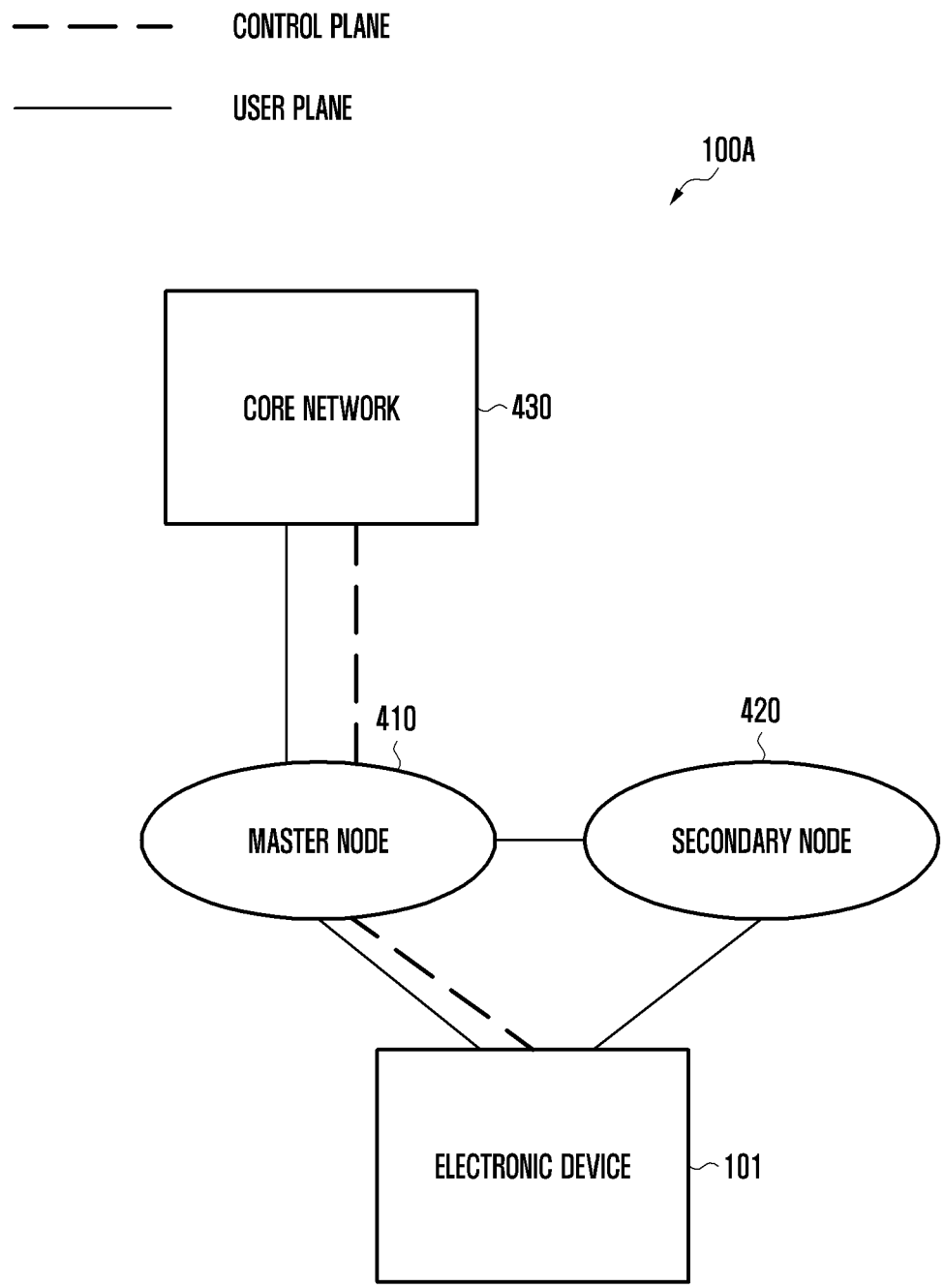
FIG. 4A illustrates wireless communication systems providing a 4G communication and/or 5G communication network according to an embodiment of the disclosure.
Figure 4B:
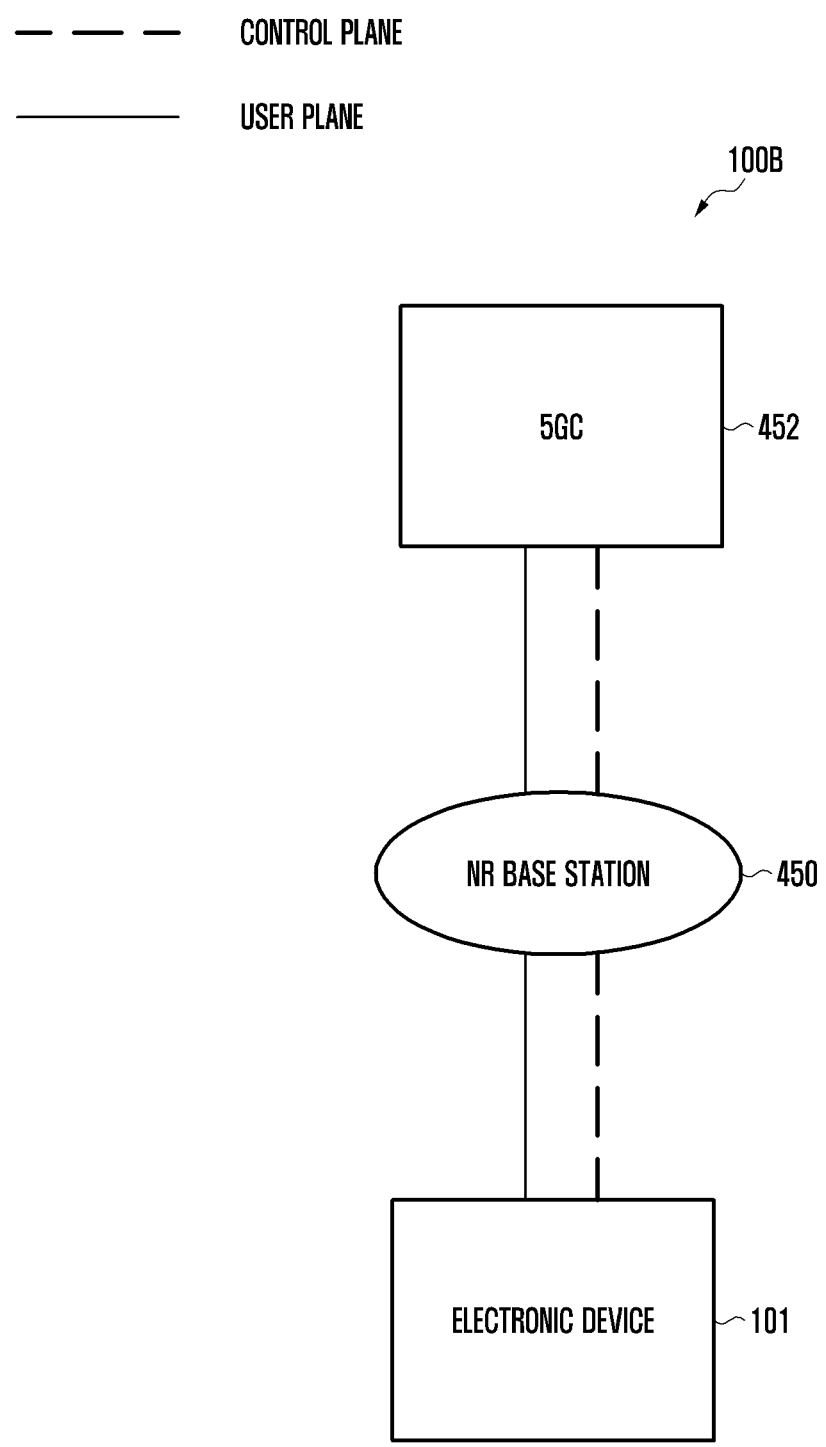
FIG. 4B illustrates wireless communication systems providing a 4G communication and/or 5G communication network according to an embodiment of the disclosure.
Figure 4C:
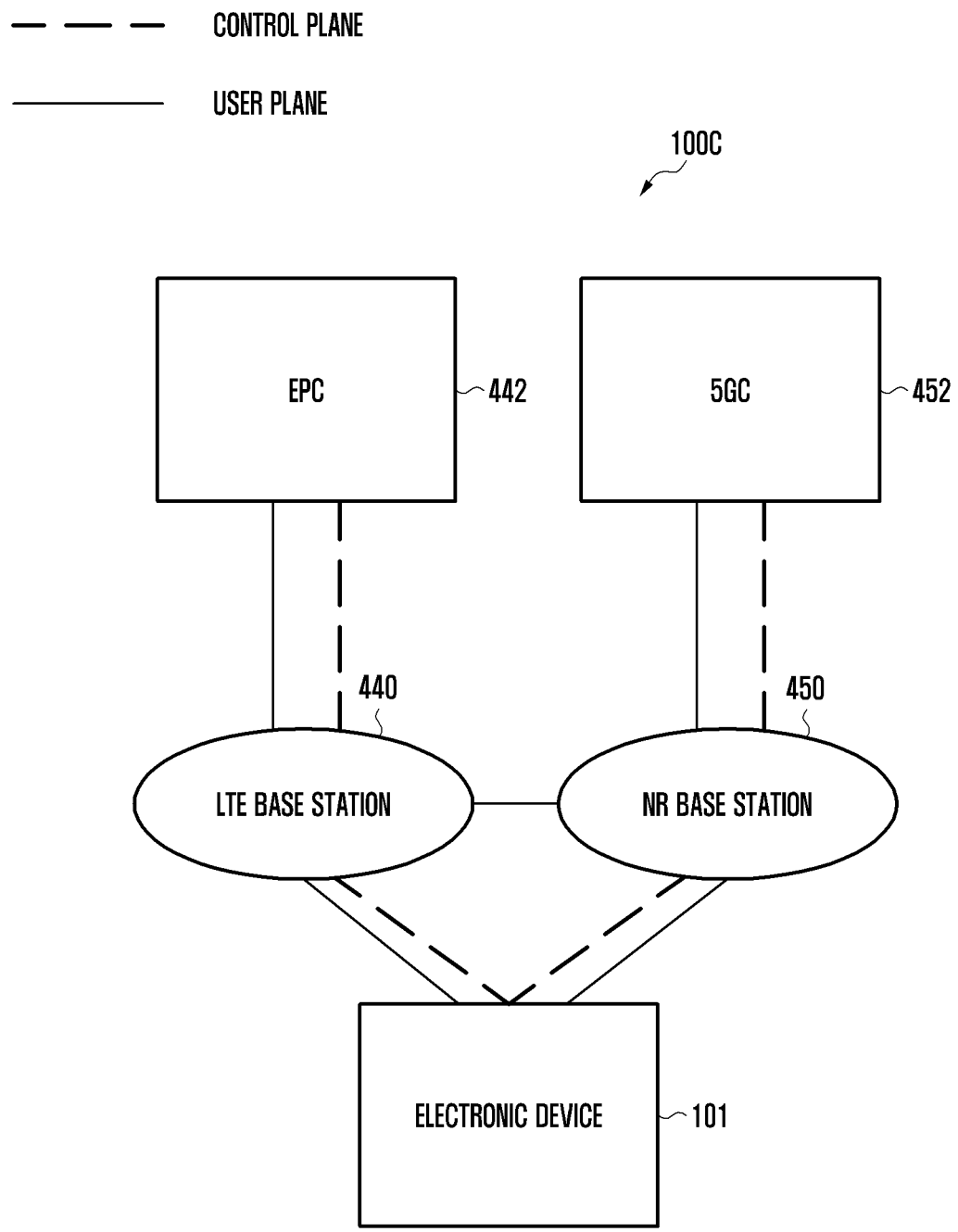
FIG. 4C illustrates wireless communication systems providing a 4G communication and/or 5G communication network according to an embodiment of the disclosure.

FIGS. 4A to 4C illustrate wireless communication systems providing a 4G (legacy) communication network and/or a 5G communication network according to various embodiments of the disclosure.

Referring to FIGS. 4A, 4B and 4C, network environments 100A, 100B and 100C, respectively, may include at least one of a 4G network and a 5G network. The 4G network may include, for example, a 4G or LTE base station (e.g., eNodeB (eNB)) 440 of a 3GPP specification supporting a wireless connection with an electronic device 101 and an evolved packet core (EPC) 442 managing 4G communication. The 5G network may include, for example, a new radio (NR) base station (e.g., gNodeB (gNB)) 450 supporting a wireless connection with the electronic device 101 and a 5th generation core (5GC) 452 managing 5G communication of the electronic device 101.

According to various embodiments, the electronic device 101 may transmit and receive a control message and user data through 4G communication and/or 5G communication. The control message may include, for example, a message associated with at least one of security control, bearer setup, authentication, registration, or mobility management of the electronic device 101. The user data may refer to, for example, user data excluding the control message transmitted and received between the electronic device 101 and a core network 430 (e.g., the EPC 442 of FIG. 4C).

Referring to FIG. 4A, the electronic device 101 according to an embodiment may transmit and receive at least one of a control message or user data to and from at least a part (e.g., the NR base station 450 and the 5GC 452 of FIG. 4C) of the 5G network using at least a part (e.g., the LTE base station 440 and the EPC 442 of FIG. 4C) of the 4G network.

According to various embodiments, a network environment 100A may include a network environment that provides multi-radio access technology (RAT) dual connectivity (MR-DC) to the LTE base station 440 and the NR base station 450 and enables transmission and reception of a control message to and from the electronic device 101 through one core network 430 of the EPC 442 or the 5GC 452.

According to various embodiments, in an MR-DC environment, one of the LTE base station 440 or the NR base station 450 may operate as a master node (MN) 410, and the other thereof may operate as a secondary node (SN) 420. The MN 410 may be connected to the core network 430 to transmit and receive a control message. The MN 410 and the SN 420 may be connected through a network interface to transmit and receive a message associated with radio resource (e.g., communication channel) management to and from each other.

According to various embodiments, the MN 410 may include the LTE base station 440, the SN 420 may include the NR base station 450, and the core network 430 may include the EPC 442. For example, a control message may be transmitted and received through the LTE base station 440 and the EPC 442, and user data may be transmitted and received through the LTE base station 440 and the NR base station 450.

Referring to 4B, according to various embodiments, the 5G network may transmit and receive a control message and user data independently of the electronic device 101.

Referring to 4C, the 4G network and the 5G network according to various embodiments may independently provide data transmission and reception. For example, the electronic device 101 and the EPC 442 may transmit and receive a control message and user data through the LTE base station 440. In another example, the electronic device 101 and the 5GC 452 may transmit and receive a control message and user data through the NR station 450.

According to various embodiments, the electronic device 101 may be registered in at least one of the EPC 442 or the 5GC 452 to transmit and receive a control message.

According to various embodiments, the EPC 442 or the 5GC 452 may interwork to manage communication of the electronic device 101. For example, movement information about the electronic device 101 may be transmitted and received through an interface (e.g., N26 interface) between the EPC 442 and the 5GC 452.

Figure 5:
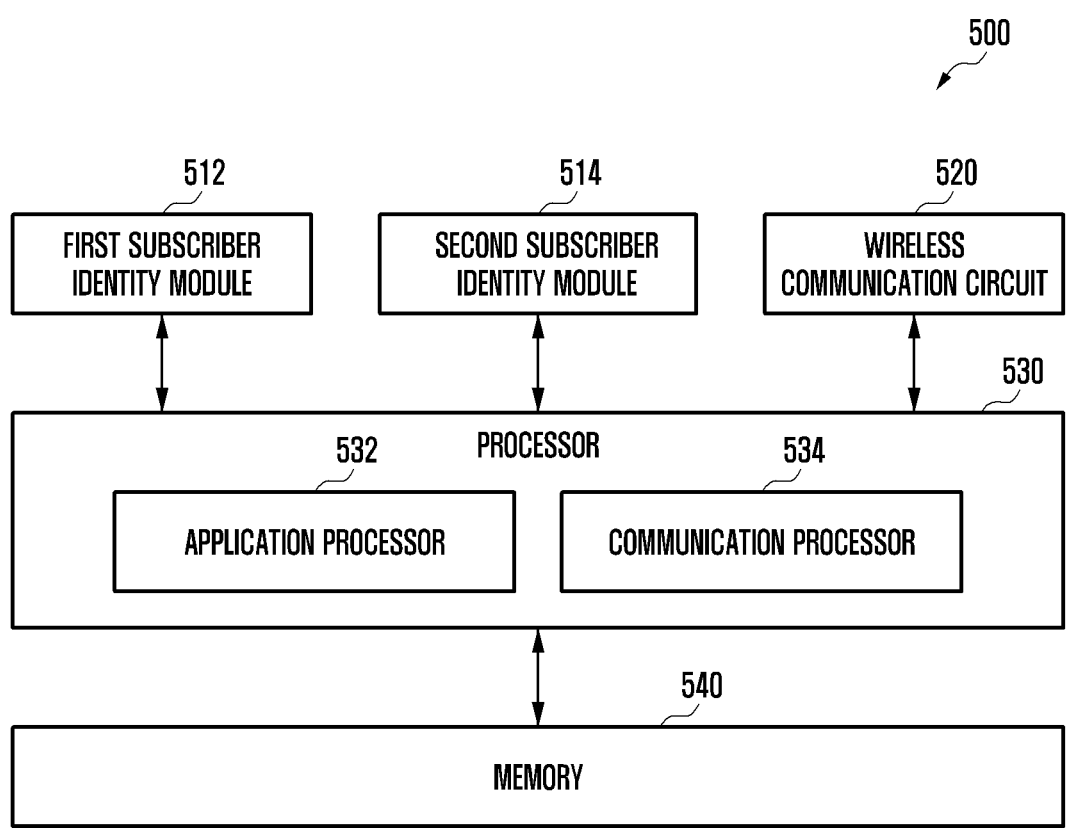
FIG. 5 is a block diagram illustrating a UE according to an embodiment of the disclosure.

FIG. 5 is a block diagram illustrating a UE according to an embodiment of the disclosure.

Referring to FIG. 5, the UE 500 may include a first subscriber identity module 512, a second subscriber identity module 514, a wireless communication circuit 520, a processor 530, and a memory 540. The UE 500 according to various embodiments may include at least some of the components and/or functions of the electronic device 101 of FIG. 1, and although some of the components illustrated in FIG. 1 or FIG. 5 are omitted or substituted, it is possible to implement various embodiments of the disclosure.

According to various embodiments, the wireless communication circuit 520 may include various circuit structures used to modulate and/or demodulate a signal in the UE 500. For example, the wireless communication circuit 520 may modulate a baseband signal into a signal in a radio frequency (RF) band to output the signal through an antenna (not shown), or may demodulate a signal in an RF band, received through the antenna, into a baseband signal and may transmit the signal to the processor 530. The wireless communication circuit 520 may include various RFICs (e.g., the first RFIC 222, the second RFIC 224, the third RFIC 226, and the fourth RFIC 228 of FIG. 2) and/or an RF front end module (e.g., the first RFFE 232, the second RFFE 234, and the third RFFE 236 of FIG. 2), and all components of the wireless communication circuit 520 may be included in the same chip, or some of the components may be included on different chips. The wireless communication circuit 520 may include at least some of the components and/or functions of the communication module 190 of FIG. 1.

According to various embodiments, the memory 540 may include a volatile memory (e.g., the volatile memory 132 of FIG. 1) and a nonvolatile memory (e.g., the non-volatile memory 134 of FIG. 1). According to various embodiments, the memory 540 may store various instructions executable through the processor 530 (or an application processor 532). The memory 540 may store the program 140 of FIG. 1.

According to various embodiments, the processor 530 may include the application processor 532 and a communication processor 534. Operations of the processor 530 described herein may be performed by the application processor 532 or by the communication processor 534, or some of the operations may be performed on the application processor 532 and the communication processor 534, respectively. The application processor 532 and the communication processor 534 may be included in the same chip (or package), or some thereof may be included on different chips (or packages). The processor 530 may be functionally, operatively, and/or electrically connected with internal components of the UE 500 including the first subscriber identity module 512, the second subscriber identity module 514, the wireless communication circuit 520, and the memory 540.

According to various embodiments, the application processor 532 is a component capable of performing control, data operation, and/or data processing of each component of the UE 500 and may include at least some of components and/or functions of the main processor 121 of FIG. 1.

Operations of the application processor 532 may be performed by loading the instructions stored in the memory 540.

According to various embodiments, the communication processor 534 is a component capable of performing control, data operation, and/or data processing of at least one communication-related component (e.g., the first subscriber identity module 512, the second subscriber identity module 514, and the wireless communication circuit 520) and may include at least one communication processor included in the auxiliary processor 123 of FIG. 1 or the wireless communication module 192 of FIG. 1. Operations of the communication processor 534 may be performed by loading the instructions stored in the memory 540.

According to various embodiments, the communication processor 534 may perform various operations for wireless communication on a cellular network. For example, the communication processor may establish a communication channel of a band to be used for wireless communication with a cellular network (e.g., a first cellular network or a second cellular network) and may support wireless communication through the established communication channel.

According to various embodiments, the subscriber identity modules (SIMs) 512 and 514 may store identification information (e.g., an international mobile subscriber identity (IMSI)) for an operation, such as access, authentication, billing, and security, in a cellular network. The UE 500 may identify the identification information stored in the subscriber identity modules 512 and 514 during a connection to the cellular network (e.g., RRC signaling) and may transmit the identification information to a base station.

According to various embodiments, the subscriber identity modules 512 and 514 may be produced as an IC card and mounted on a slot provided in the UE 500. According to another embodiment, at least one of the subscriber identity modules 512 and 514 may be configured as an embedded-SIM (or an embedded universal integrated circuit card (eUICC)) embedded in the UE 500. When the subscriber identity modules 512 and 514 are configured as embedded-SIMs, a security chip for storing the subscriber identity modules 512 and 514 may be disposed on a circuit board of the UE 500 and may then be mounted on the UE 500 through remote SIM provisioning in a manufacturing process.

According to various embodiments, the UE 500 may include two or more subscriber identity modules. Although an embodiment in which the UE 500 includes two subscriber identity modules (e.g., a first subscriber identity module 512 and a second subscriber identity module 514) will be described in this disclosure, the disclosure is not limited thereto.

According to various embodiments, the UE 500 may perform wireless communication with a first cellular network and a second cellular network operated by different operators (or mobile network carriers) using the first subscriber identity module 512 and the second subscriber identity module 514. For example, when connecting to the first cellular network, the UE 500 may wirelessly connect to a base station of the first cellular network using first identification information stored in the first subscriber identity module 512, and when connecting to the second cellular network, the UE 500 may wirelessly connect to a base station of the second cellular network using second identification information stored in the second subscriber identity module 514. According to another embodiment, the first subscriber identity module 512 and the second subscriber identity module 514 may correspond to the same operator, and the UE 500 may be allocated different pieces of identification information through the first subscriber identity module 512 and the second subscriber identity module 514 and may use the pieces of identification information for a call and data communication.

According to various embodiments, the first cellular network and/or the second cellular network may be a 5G standalone (SA) new radio (NR) network. The 5G SA NR network may be a system (e.g., FIG. 4B) in which access and core network technologies are implemented in accordance with a 5G NR standard without using 4G network communication (e.g., a long-term evolution (LTE) network).

According to various embodiments, the processor 530 may be connected to the first cellular network using the first identification information of the first subscriber identity module 512. For example, the processor 530 may attempt an initial attach when the UE 500 is turned on. The processor 530 may synchronize with the first cellular network 720 via a public land mobile network (PLMN) and cell search process immediately after being turned on and may then transmit an attach request message including the first identification information (e.g., IMSI) of the first subscriber identity module 512 to the first cellular network 720. When network registration using the first identification information is successful, the first cellular network may allocate an IP address to be used for data communication and may provide the IP address to the UE 500 according to a public data network (PDN) (or protocol data unit (PDU)) connection request of the UE 500. The processor 530 may connect to the second cellular network using the second identification information of the second subscriber identity module 514 in the same manner as described above.

According to various embodiments, the processor 530 may simultaneously connect to the first cellular network and the second cellular network using the first subscriber identity module 512 and the second subscriber identity module 514 but may perform Internet data communication through only one cellular network. For example, the UE 500 may obtain an Internet protocol (IP) address allocated from an IP multimedia subsystem (IMS) for a voice call and an IP address allocated for data communication. Here, the UE 500 may be allocated all IP addresses by the IMS for both the first cellular network and the second cellular network, thereby being provided with a voice call service in the first cellular network using the first identification information and being provided with a voice call service in the second cellular network using the second identification information. However, the UE 500 may be allocated an IP address for only one of the first cellular network or the second cellular network for data communication of Internet data, thus being provided with data communication through only one network.

According to various embodiments, the UE 500 may determine one of the first subscriber identity module 512 and the second subscriber identity module 514 to be used for Internet data communication by user selection. For example, when the first subscriber identity module 512 is selected by the user selection, the UE 500 may perform data communication and IMS communication with the first cellular network using the first identification information of the first subscriber identity module 512 and may perform only IMS communication with the second cellular network using the second identification information of the second subscriber identity module 514. On the contrary, when the second subscriber identity module 514 is selected by the user selection, the UE 500 may perform only IMS communication with the first cellular network using the first identification information of the first subscriber identity module 512 and may perform Internet data communication and IMS communication with the second cellular network using the second identification information of the second subscriber identity module 514.

According to various embodiments, a subscriber identity module to be used for data communication in the UE 500 may be changed. For example, the processor 530 may detect an activity of triggering data communication through the second cellular network while performing data communication using the first subscriber identity module 512. Here, the activity may be, for example, an occasion in which a user configuration or communication with the second cellular network is changed to at least temporarily use data communication. For example, the UE 500 may receive a user input to change a configuration on a menu while performing Internet data communication with the first cellular network using the first subscriber identity module 512. The UE 500 may change the subscriber identity module for data communication to the second subscriber identity module 514, based on the received user input. Alternatively, when an application in which an Internet data configuration is changed, such as a multimedia messaging service (MMS), is used in the second subscriber identity module 514 using only the IMS, the UE 500 may establish a connection for data communication with the second cellular network at least temporarily using the second identification information.

According to various embodiments, the processor 530 may configure a subscriber identity module that is used only for IMS communication without being used for Internet data communication among the first subscriber identity module 512 and the second subscriber identity module 514 to be provided with a narrow bandwidth from the base station of the cellular network. For example, when it is configured for a user to use Internet data communication only with the first cellular network using the first subscriber identity module 512 and the second cellular network supports voice over NR (VoNR), the UE 500 may stay in SA NR for the second cellular network and may perform a paging monitoring operation. Although a voice call (or IMS communication) does not require a wide bandwidth for communication with a base station compared to Internet data communication, even a voice call requesting a small number of resource blocks (RBs) may monitor a wide bandwidth according to an active bandwidth configured in a network. This unnecessary wide bandwidth monitoring may increase current consumption of the UE 500. Accordingly, the UE 500 according to various embodiments may configure a SIM stack used only for IMS communication to be allocated a narrow bandwidth.

According to various embodiments, for the SIM stack not used for Internet data communication to be allocated a narrow bandwidth, the processor 530 may configure a parameter enabling the UE 500 to support a narrow bandwidth for a corresponding cellular network in UE capability information. The UE 500 may receive a UE capability enquiry from a base station in a registration process for the cellular network (or RRC signaling) and may transmit UE capability information to the base station in response.

According to various embodiments, the UE capability information may include various pieces of information about a capability related to radio access of the UE 500, and information elements included in the UE capability information may include details defined in 6.3.3 UE capability information elements of 3GPP TS 38.331 (RRC protocol specification).

According to an embodiment, for the SIM stack not used for Internet data communication, the processor 530 may configure a bandwidth supported for each subcarrier spacing (SCS) to a narrow bandwidth in a bandwidth part of the UE capability information. For example, the UE 500 may configure a currently supportable maximum bandwidth in the bandwidth part of the UE capability information, and the processor 530 may configure a value narrower than the previously configured maximum bandwidth for the SIM stack not used for Internet data communication. For example, the processor 530 may configure the bandwidth part to a bandwidth corresponding to the number of resource blocks (RBs) on a table (e.g., Table 13-1: Set of resource blocks and slot symbols of CORESET for Type0-physical downlink control channel (PDCCH) search space set when {SS/PBCH block, PDCCH} SCS is {15, 15} kHz for frequency bands with minimum channel bandwidth 5 MHz or 10 MHz) of TS38.213 Clause 13 (UE procedure for monitoring Type0-PDCCH common search space (CSS) sets) through an index according to NR MIB searchSpaceZero. According to another embodiment, the UE may configure the narrowest configurable bandwidth for each SCS in the bandwidth part.

The bandwidth part may indicate a bandwidth in which the UE 500 is expected to receive a specific numerology (e.g., subcarrier spacing and a cyclic prefix) currently transmitted.

According to an embodiment, the processor 530 may configure the bandwidth supported for each SCS to a bandwidth narrower than the currently supportable maximum bandwidth (or to the narrowest configurable bandwidth) in the bandwidth part. For example, the processor 530 may configure only the lowest bit among bits corresponding to each bandwidth to 1 in channelBWs-DL and channelBWs-UL of the bandwidth part and may configure the remaining bits to 0.

The UE capability information may include a BandNR parameter indicating a bandwidth supported by the UE 500, and the BandNR parameter may include channelBWs-DL related to a downlink channel bandwidth and channelBWs-UL related to an uplink channel bandwidth. Here, channelBWs-DL and channelBWs-UL may include a bandwidth supported for each SCS (e.g., 15 kHz, 30 kHz, and 60 kHz) in a first frequency band (FR1: sub-6 GHz) and a second frequency band (FR2: mmWave (24 to 100 GHz)). For example, channelBWs-DL and channelBWs-UL may include a plurality of bits corresponding to individual channel bandwidths (e.g., 5 MHz, 10 MHz, 15 MHz, 20 MHz, 25 MHz, 30 MHz, 40 MHz, 50 MHz, 60 MHz, 80 MHz, and 100 MHz in FR1 and 50 MHz, 100 MHz, and 200 MHz in FR2) supported by a cellular network, each bit configured to 1 may indicate that a corresponding channel bandwidth is supported, and each bit configured to 0 may indicate that the corresponding channel bandwidth is not supported.

Table 1 according to an embodiment shows an example of channelBWs-DL modified by the processor 530 so that the SIM stack not used for Internet data communication is allocated a narrow bandwidth.

TABLE 1 channelBWs-DL-v1530 fr1: {
scs-15kHz '0000000000'B,
scs-30kHz '0000001111'B => '1000000000'B, => support 5MHz
scs-60kHz '0000000000'B
}

In Table 1, the UE 500 may configure the UE capability information such that 50 MHz, 60 MHz, 80 MHz, and 100

MHz can be supported in FR1 and scs-30 kHz but only the narrowest 5 MHz is supported for the SIM stack not used for Internet data communication but used only for IMS communication and may transmit the UE capability information to the cellular network. Upon receiving the UE capability information, the cellular network may allocate an uplink and/or downlink bandwidth to 5 MHz for the UE 500 with reference to channelBWs-DL and channelBWs-UL of the UE capability information.

According to an embodiment, the UE 500 may transmit the UE capability information including bandwidth part information configured as a default (e.g., such that channelBWs-DL and channelBWs-UL are configured to support 50 MHz, 60 MHz, 80 MHz, and 100 MHz) or including no bandwidth part for a SIM stack determined to be used for both Internet data communication and IMS communication. In this case, the cellular network may allocate uplink and downlink bandwidths for the UE 500, based on the bandwidth part information.

According to an embodiment, for the SIM stack not used for Internet data communication, the processor 530 may configure a parameter indicating a supportable bandwidth to a parameter corresponding to a bandwidth narrower than the currently supportable maximum bandwidth in a downlink feature set and an uplink feature set of the UE capability information.

For example, the processor 530 may configure a supportedBandwidthDL parameter of FeaturesetDownlinkPerCC of the UE capability information to a parameter corresponding to the narrowest bandwidth and may configure a supportedBandwidthUL parameter of FeaturesetUplinkPerCC of the UE capability information to a parameter corresponding to the narrowest bandwidth. Here, FeaturesetDownlinkPerCC and FeaturesetUplinkPerCC may include pieces of information indicating feature sets that the UE 500 supports for a carrier corresponding to one band entry of a band combination and may be defined in 3GPP TS 38.331 (RRC protocol specification).

Illustrative information elements of FeaturesetDownlinkPerCC according to an embodiment are shown in Table 2.

TABLE 2

FeatureSetDownlinkPerCC ::= SEQUENCE {
supportedSubcarrierSpacingDLSubcarrierSpacing,
supportedBandwidthDLSupportedBandwidth,
channelBW-90mhz ENUMERATED {supported} OPTIONAL,
maxNumberMIMO-LayersPDSCH MIMO-LayersDL OPTIONAL,
supportedModulationOrderDLModulationOrder OPTIONAL
}

In the above information elements, supportedBandwidthDL includes a SupportedBandwidth IE, and a bandwidth configurable for FR1 and FR2 may be defined in Table 3.

TABLE 3

SupportedBandwidth ::= CHOICE {
fr1 ENUMERATED {mhz5, mhz10, mhz15, mhz20, mhz25, mhz30, mhz40, mhz50, mhz60, mhz80, mhz100},
fr2 ENUMERATED {mhz50, mhz100, mhz200, mhz400}
}

According to an embodiment, the processor 530 may configure a bandwidth supported for each carrier component (CC) to the lowest value in a corresponding parameter in Table 4.

TABLE 4

NRUECAPA_SupportedBandwidthFr_mhz5 = 0,
NRUECAPA_SupportedBandwidthFr_mhz10,
NRUECAPA_SupportedBandwidthFr_mhz15,
NRUECAPA_SupportedBandwidthFr_mhz20,
NRUECAPA_SupportedBandwidthFr_mhz25,
NRUECAPA_SupportedBandwidthFr_mhz30 = 5,
NRUECAPA_SupportedBandwidthFr_mhz100 = 10, // used for both Fr1 and Fr2
NRUECAPA_SupportedBandwidthFr_mhz200, // used for both Fr1 and Fr2
NRUECAPA_SupportedBandwidthFr_mhz400 = 12, // used for both Fr1 and Fr2

In Table 4, SupportedBandwidth may be mapped to parameters 0 to 12 corresponding to 5 MHz, 10, 15, 20, 25, 30, 40, 50, 60, 80, 100, 200, and 400 MHz. The processor 530 may change FeaturesetDownlinkPerCC such that the SupportedBandwidth IE includes a parameter (e.g., 0) corresponding to the narrowest bandwidth (e.g., 5 MHz).

The processor 530 may change the supportedBandwidthUL parameter of FeaturesetUplinkPerCC of the UE capability information by the above method.

The foregoing example corresponds to some embodiments disclosed herein, and the processor 530 may change other parameters related to a bandwidth among information transmitted by the UE 500 to the cellular network.

According to various embodiments, the processor 530 may transmit the modified UE capability information to the base station of the cellular network through the communication circuit by the foregoing method and may be allocated a narrow bandwidth. For the SIM stack used for Internet data communication, the processor 530 may sequentially or at least partially simultaneously transmit the UE capability information that is configured as a default or that is not modified to the base station of the cellular network and may be allocated a wide bandwidth.

According to various embodiments, the processor 530 may identify the charging state of a battery (e.g., the battery 189 of FIG. 1) of the UE 500, and may configure a parameter for supporting a narrow bandwidth in the UE capability information when the charging state is a predetermined level or less. For example, when the UE 500 is turned on or the SIM stack used for Internet data communication is changed, the processor 530 may identify the level of the battery and may identify whether the identified level is a predetermined level (e.g., 15%) or less. When the level of the battery is greater than the predetermined level, the processor 530 may transmit the UE capability information to the cellular network without changing the UE capability information or by including the previously configured bandwidth for the SIM stack not used for Internet data communication. When the level of the battery is the predetermined level or less, the processor 530 may transmit the UE capability information to the cellular network by changing the UE capability information such that a parameter for supporting a narrow bandwidth is configured for the SIM stack not used for Internet data communication.

Figure 6:
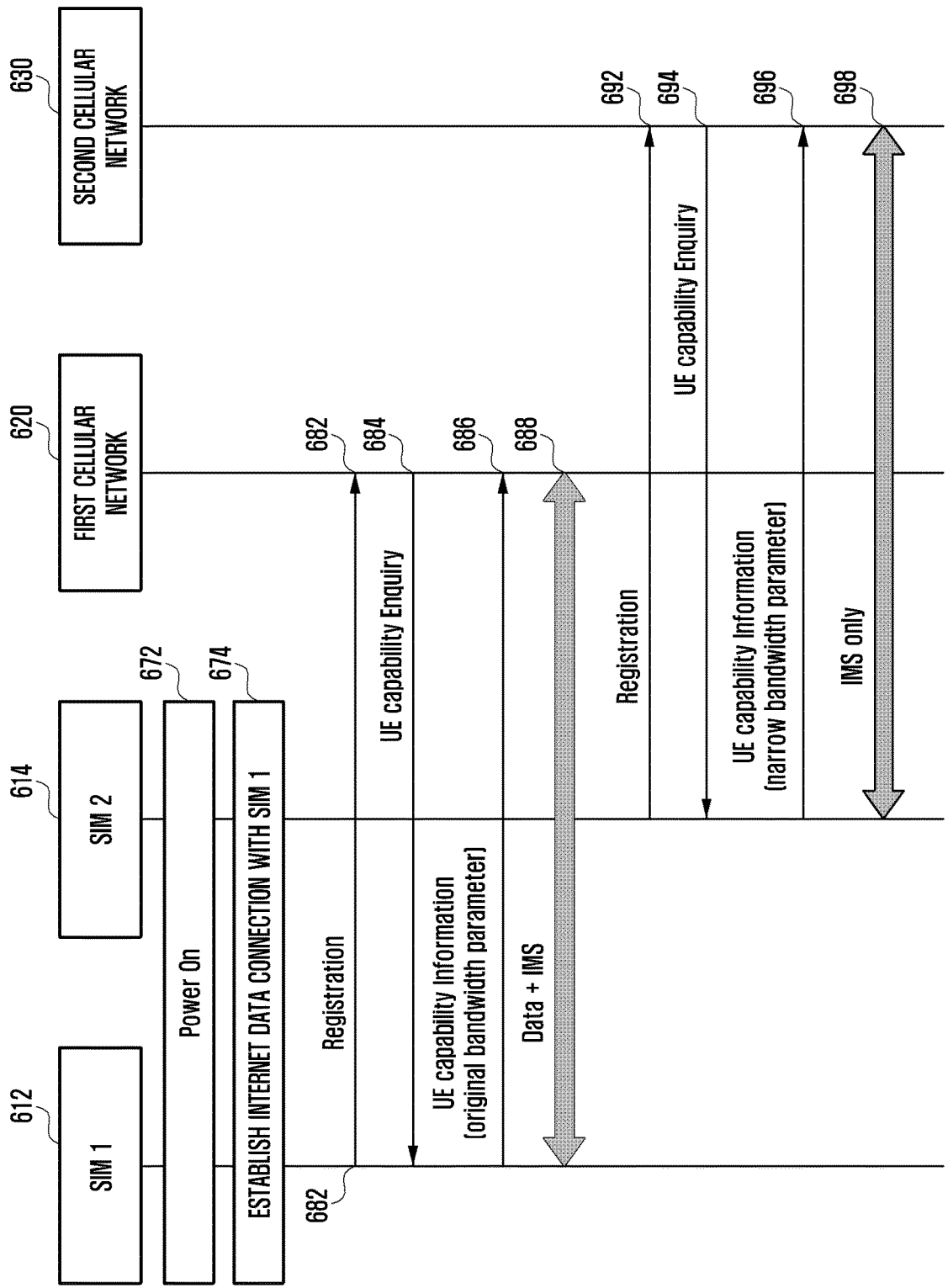
FIG. 6 illustrates a process in which a UE connects to a first cellular network and a second cellular network when turned on according to an embodiment of the disclosure.

FIG. 6 illustrates a process in which a UE connects to a first cellular network and a second cellular network when turned on according to an embodiment of the disclosure.

Referring to FIG. 6, a first subscriber identity module 612 (SIM 1) and a second subscriber identity module 614 (SIM 2) may be included in the UE (e.g., the UE 500 of FIG. 5), and the UE may communicate with the first cellular network 620 using identification information of the first subscriber identity module 612, and may communicate with the second cellular network 630 using identification information of the second subscriber identity module 614. In FIG. 6, the first cellular network 620 and the second cellular network 630 may refer to a base station of the first cellular network 620 and a base station of the second cellular network 630, respectively. At least one of the first cellular network 620 and the second cellular network 630 may be a 5G SA NR network. For example, it is assumed in FIG. 6 that the second cellular network 630 is a 5G SA NR network, which supports VoNR.

According to various embodiments, when turned on (672), the UE (e.g., the UE 500 of FIG. 5) may identify a subscriber identity module to be used for Internet data communication among the first subscriber identity module 612 and the second subscriber identity module 614. In operation 674, the UE (e.g., the processor 530 of FIG. 5) may identify that Internet data communication is configured to be performed through the first cellular network 620 using the first subscriber identity module 612 according to user selection or a configured value stored in a memory (e.g., the memory 540 of FIG. 5).

According to various embodiments, in operation 682, the UE 500 may request registration from the first cellular network 620. Since the first subscriber identity module 612 is selected as a SIM stack to be used for Internet data communication, the UE 500 may request registration for Internet data communication and IMS communication. Here, a registration request may include RRC signaling.

According to various embodiments, in operation 684, the UE 500 may receive a request for UE capability information from a base station of the first cellular network 620. When the UE 500 transitions to an RRC-connected state, the base station of the first cellular network 620 may transmit a UE capability enquiry message to the UE 500.

According to various embodiments, in operation 686, the UE 500 may transmit UE capability information about the UE 500 in response to the request for UE capability information from the first cellular network 620. Information elements included in the UE capability information may include details defined in 6.3.3 UE capability information elements of 3GPP TS 38.331 (RRC protocol specification).

Here, the UE 500 may transmit information related to a supported bandwidth in the UE capability information without changing a bandwidth parameter configured as a default. Accordingly, the UE 500 can be expected to be allocated a wide bandwidth for Internet data communication and IMS communication.

According to various embodiments, in operation 688, when a connection with the first cellular network 620 is completed, the UE 500 may be allocated an IP address and may perform Internet data communication and IMS communication with the first cellular network 620.

Although FIG. 6 shows that operations 692 to 698 to be described below are performed after operations 682 to 688, operations 692 to 698 may be performed before or at least partially simultaneously with operations 682 to 688.

According to various embodiments, in operation 692, the UE 500 may request registration from the second cellular network 630. Since the first subscriber identity module 612 is selected as the SIM stack to be used for Internet data communication, the UE 500 may request registration for IMS communication from the second cellular network 630.

According to various embodiments, in operation 694, the UE 500 may receive a request for UE capability information from a base station of the second cellular network 630.

According to various embodiments, in operation 696, the UE 500 may transmit UE capability information about the UE 500 in response to the request for UE capability information from the second cellular network 630. According to various embodiments, the UE 500 may configure a parameter for the UE 500 to support a narrow bandwidth for the corresponding cellular network in the UE capability information in order to be allocated a narrow bandwidth for the second subscriber identity module 614 not used for Internet data communication.

According to an embodiment, the UE 500 may configure a bandwidth supported for each subcarrier spacing (SCS) to a bandwidth narrower than a currently supportable maximum bandwidth (or to the narrowest bandwidth) in a bandwidth part of the UE capability information. The UE 500 may configure only the lowest bit among bits corresponding to each bandwidth to 1 in channelBWs-DL and channelBWs-UL of the bandwidth part and may configure the remaining bits to 0. The UE capability information may include a BandNR parameter indicating a bandwidth supported by the UE 500, and the BandNR parameter may include channelBWs-DL related to a downlink channel bandwidth and channelBWs-UL related to an uplink channel bandwidth. The UE 500 may configure only a bit corresponding to the narrowest bandwidth (e.g., 50 MHz) among channel bandwidths (e.g., 5 MHz, 10 MHz, 15 MHz, 20 MHz, 25 MHz, 30 MHz, 40 MHz, 50 MHz, 60 MHz, 80 MHz, and 100 MHz in FR1 and 50 MHz, 100 MHz, and 200 MHz in FR2) supported in the cellular network to 1 and may configure the remaining bits to 0 in channelBWs-DL and channelBWs-UL.

According to another embodiment, the UE 500 may configure a parameter indicating a supportable bandwidth to a parameter corresponding to a bandwidth narrower than the currently supportable maximum bandwidth (or to the narrowest bandwidth) in a downlink feature set and an uplink feature set of the UE capability information. For example, the UE 500 may configure a supportedBandwidthDL parameter of FeaturesetDownlinkPerCC of the UE capability information to a parameter corresponding to the narrowest bandwidth and may configure a supportedBandwidthUL parameter of FeaturesetUplinkPerCC of the UE capability information to a parameter corresponding to the narrowest bandwidth.

According to an embodiment, when the charging level of a battery is a predetermined level or less, the UE 500 may configure a parameter for the UE 500 to support a narrow bandwidth for the corresponding cellular network in the UE capability information for the second subscriber identity module 614 in operation 696. However, when the charging level of the battery is greater than the predetermined level, the UE 500 may transmit the UE capability information including a bandwidth parameter configured as a default (e.g., the currently supportable maximum bandwidth) to the second cellular network 630, instead of performing operation 696.

According to various embodiments, in operation 698, the UE 500 may be allocated a narrow bandwidth from the second cellular network 630 and may perform IMS communication with the second cellular network 630.

Figure 7:
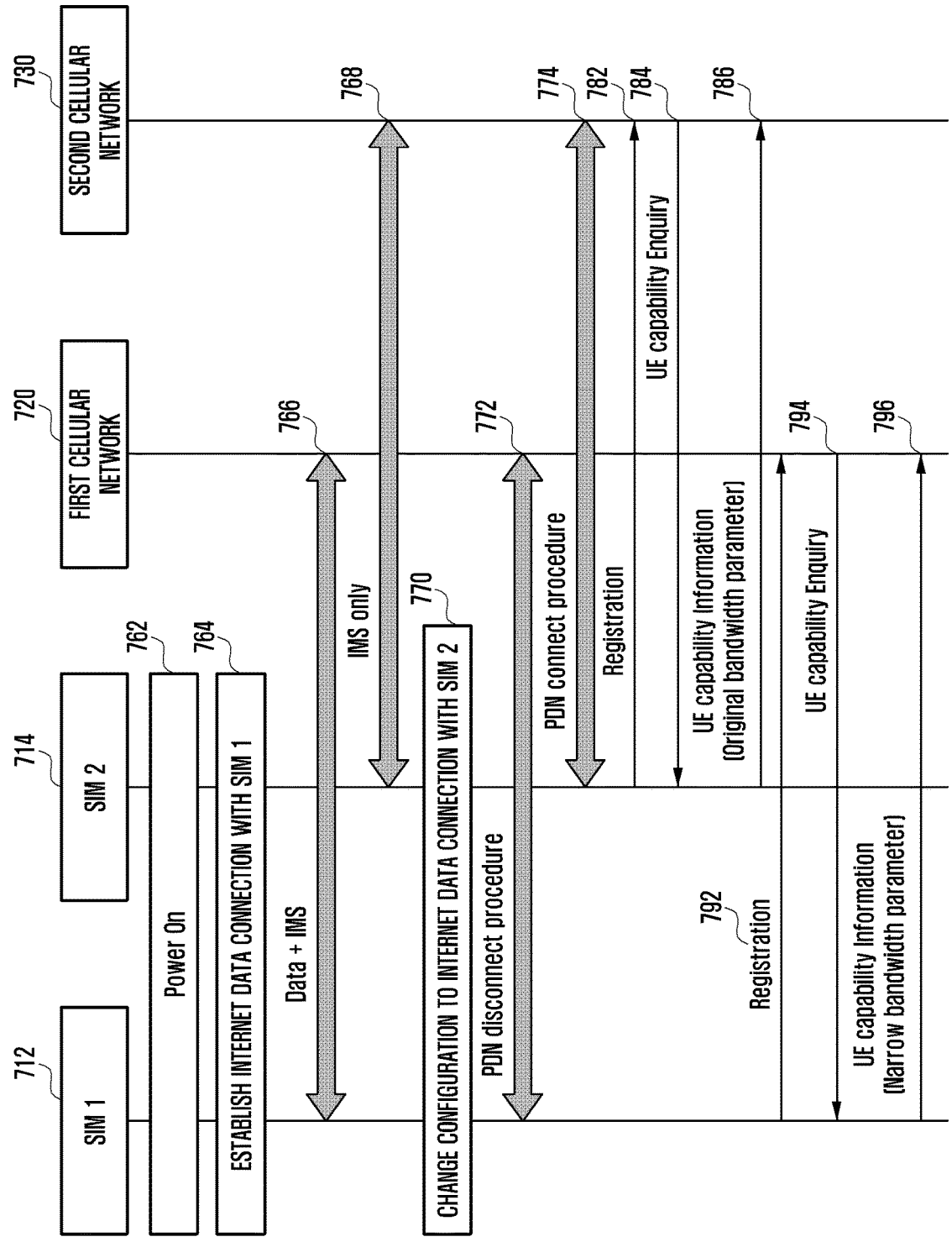
FIG. 7 illustrates a process in which a UE connects to a first cellular network and a second cellular network when an Internet data configuration is changed according to an embodiment of the disclosure.

FIG. 7 illustrates a process in which a UE connects to a first cellular network and a second cellular network when an Internet data configuration is changed according to an embodiment of the disclosure.

Referring to FIG. 7, according to various embodiments, when turned on (762), the UE (e.g., the UE 500 of FIG. 5) may identify that Internet data communication is configured with a first subscriber identity module 712 (764).

According to various embodiments, in operation 766, the UE (e.g., the UE 500 of FIG. 5) may perform Internet data communication and IMS communication with a first cellular network 720 using the first subscriber identity module 712 configured to use Internet data communication. In operation 768, the UE 500 may perform IMS communication with a second cellular network 730 using a second subscriber identity module 714 configured not to use Internet data communication.

According to various embodiments, in operation 770, the UE 500 may detect an activity of triggering Internet data communication through the second cellular network 730 while performing the Internet data communication with the first cellular network 720. Here, the activity may be, for example, an occasion in which a user configuration or communication with the second cellular network 730 is changed to at least temporarily use data communication.

According to various embodiments, in operation 772, the UE 500 disconnects a bearer connected to the first cellular network 720 through a PDN disconnection procedure (or PDU session release procedure) and may delete related IP address information.

According to various embodiments, in operation 774, the UE 500 start a PDN connectivity procedure (or PDU session establishment procedure) with the second cellular network 730 using second identification information of the second subscriber identity module 714.

According to various embodiments, in operation 782, the UE 500 may request registration from the second cellular network 730. Since a SIM stack to be used for Internet data communication is changed to the second subscriber identity module 714, the UE 500 may request registration for Internet data communication and IMS communication from the second cellular network 730.

According to various embodiments, in operation 784, the UE 500 may receive a request for UE capability information from a base station of the second cellular network 730.

According to various embodiments, in operation 786, the UE 500 may transmit UE capability information including an original bandwidth parameter (e.g., a default bandwidth parameter or a currently supportable maximum bandwidth parameter) to the second cellular network 730. Accordingly, the UE 500 may be allocated a wide bandwidth from the second cellular network 730 and may perform Internet data communication and IMS communication.

According to various embodiments, in operation 792, the UE 500 may request registration from the first cellular network 720. Since the SIM stack to be used for Internet data communication is changed to the second subscriber identity module 714, the UE 500 may request registration for IMS communication from the first cellular network 720.

According to various embodiments, in operation 794, the UE 500 may receive a request for UE capability information from a base station of the first cellular network 720.

According to various embodiments, in operation 796, the UE 500 may transmit UE capability information about the UE 500 in response to the request for UE capability information from the first cellular network 720. Here, to be allocated a narrow bandwidth, the UE 500 may configure a parameter for the UE 500 to support a narrow bandwidth for the cellular network in the UE capability information. For example, the UE 500 may configure a bandwidth supported for each subcarrier spacing (SCS) to a bandwidth narrower than the currently supportable maximum bandwidth (or to the narrowest bandwidth) in a bandwidth part of the UE capability information and/or may configure a parameter indicating a supportable bandwidth to a parameter corresponding to the bandwidth narrower than the currently supportable maximum bandwidth (or to the narrowest bandwidth) in a downlink feature set and an uplink feature set of the UE capability information.

Accordingly, the UE 500 may be allocated a narrow bandwidth from the first cellular network 720 and may perform IMS communication.

Figure 8:
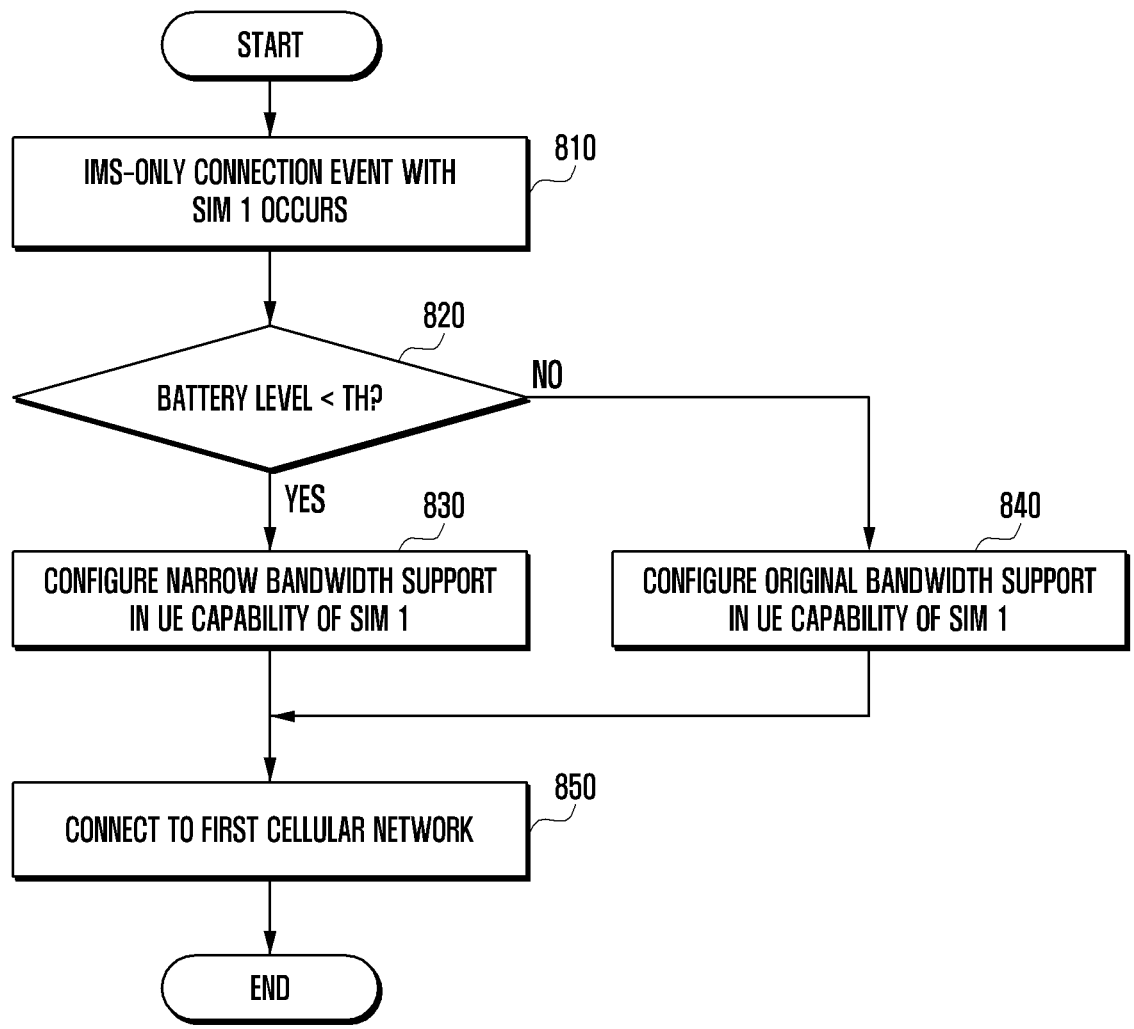
FIG. 8 is a flowchart illustrating a method in which a UE determines a bandwidth of UE capability information, based on a battery level according to an embodiment of the disclosure.

FIG. 8 is a flowchart illustrating a method in which a UE determines a bandwidth of UE capability information, based on a battery level according to an embodiment of the disclosure.

Referring to FIG. 8, the illustrated method may be performed by the foregoing UE (e.g., the UE 500 of FIG. 5) including a first subscriber identity module (e.g., the first subscriber identity module 512 of FIG. 5) supporting communication with a first cellular network and a second subscriber identity module (e.g., the second subscriber identity module 514 of FIG. 5) supporting communication with a second cellular network and may be performed by at least one of the application processor 532 and/or the communication processor 534. A description of technical features described above will be omitted below.

According to various embodiments, in operation 810, the UE 500 may identify an event in which the first subscriber identity module 512 is used only for IMS communication. For example, when turned on, the UE 500 may identify that Internet data communication is configured to be performed with the second subscriber identity module 514, or may identify an event in which a configuration is changed to perform Internet data communication with the second subscriber identity module 514, such as an occasion in which a user configuration or communication with the second cellular network is changed to at least temporarily use data communication, while performing Internet data communication with the first subscriber identity module 512. The UE 500 may establish a connection with the first cellular network for IMS communication using the first subscriber identity module 512, and the first cellular network may be a 5G SA NR network.

According to various embodiments, in operation 820, the UE 500 may identify the charging state of a battery and may determine whether a charging level is a predetermined level or less.

According to various embodiments, when the charging level of the battery is greater than the predetermined level, the UE 500 may configure a supported bandwidth to previously configured bandwidth information or bandwidth information configured as a default in UE capability information to be transmitted to the first cellular network and may transmit the UE capability information in operation 840. Accordingly, the UE 500 may be allocated a wide bandwidth and may perform IMS communication with the first cellular network.

According to various embodiments, when the charging level of the battery is less than the predetermined level, the UE 500 may configure a parameter for supporting a narrow bandwidth in the UE capability information to be transmitted to the first cellular network in operation 830. For example, the UE 500 may configure a bandwidth supported for each subcarrier spacing (SCS) to the narrowest bandwidth in a bandwidth part of the UE capability information and/or may configure a parameter indicating a supportable bandwidth to a parameter corresponding to the narrowest bandwidth in a downlink feature set and an uplink feature set of the UE capability information.

According to various embodiments, in operation 850, the UE 500 may be allocated a narrow bandwidth from the first cellular network and may perform IMS communication.

Figure 9:
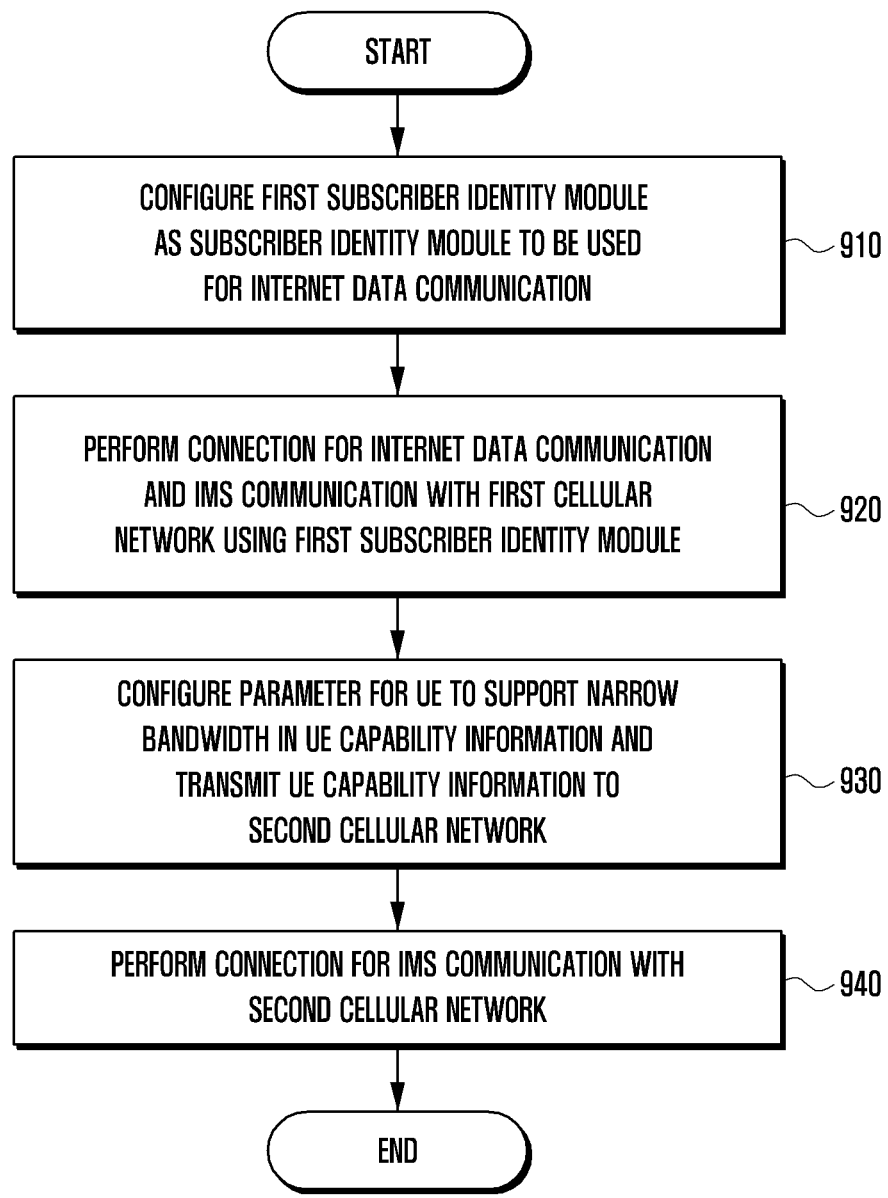
FIG. 9 is a flowchart illustrating a method in which a UE configures a bandwidth according to an embodiment of the disclosure.

FIG. 9 is a flowchart illustrating a method in which a UE configures a bandwidth according to an embodiment of the disclosure.

Referring to FIG. 9, the illustrated method may be performed by the foregoing UE (e.g., the UE 500 of FIG. 5) including a first subscriber identity module (e.g., the first subscriber identity module 512 of FIG. 5) supporting communication with a first cellular network and a second subscriber identity module (e.g., the second subscriber identity module 514 of FIG. 5) supporting communication with a second cellular network and may be performed by at least one of the application processor 532 and/or the communication processor 534. According to various embodiments, in operation 910, the UE 500 may configure the first subscriber identity module 512 as a subscriber identity module to be used for Internet data communication.

According to various embodiments, in operation 920, the UE 500 may perform a process of connecting to the first cellular network for Internet data communication and IMS communication. The UE 500 may transmit UE capability information without changing a bandwidth supported by the UE 500 in response to a UE capability enquiry from the first cellular network and may be allocated a wide bandwidth to connect to the first cellular network.

According to various embodiments, in operation 930, the UE 500 may configure a parameter for supporting a narrow bandwidth in the UE capability information for the second cellular network configured not to use Internet data communication and may transmit the UE capability information to the second cellular network. For example, the UE 500 may configure a bandwidth supported for each subcarrier spacing (SCS) to a bandwidth narrower than a currently supportable maximum bandwidth (or to the narrowest bandwidth) in a bandwidth part of the UE capability information and/or may configure a parameter indicating a supportable bandwidth to a parameter corresponding to the bandwidth narrower than the currently supportable maximum bandwidth (or to the narrowest bandwidth) in a downlink feature set and an uplink feature set of the UE capability information.

According to various embodiments, in operation 940, the UE 500 may be allocated a narrow bandwidth from the second cellular network and may perform IMS communication.

Figure 10:
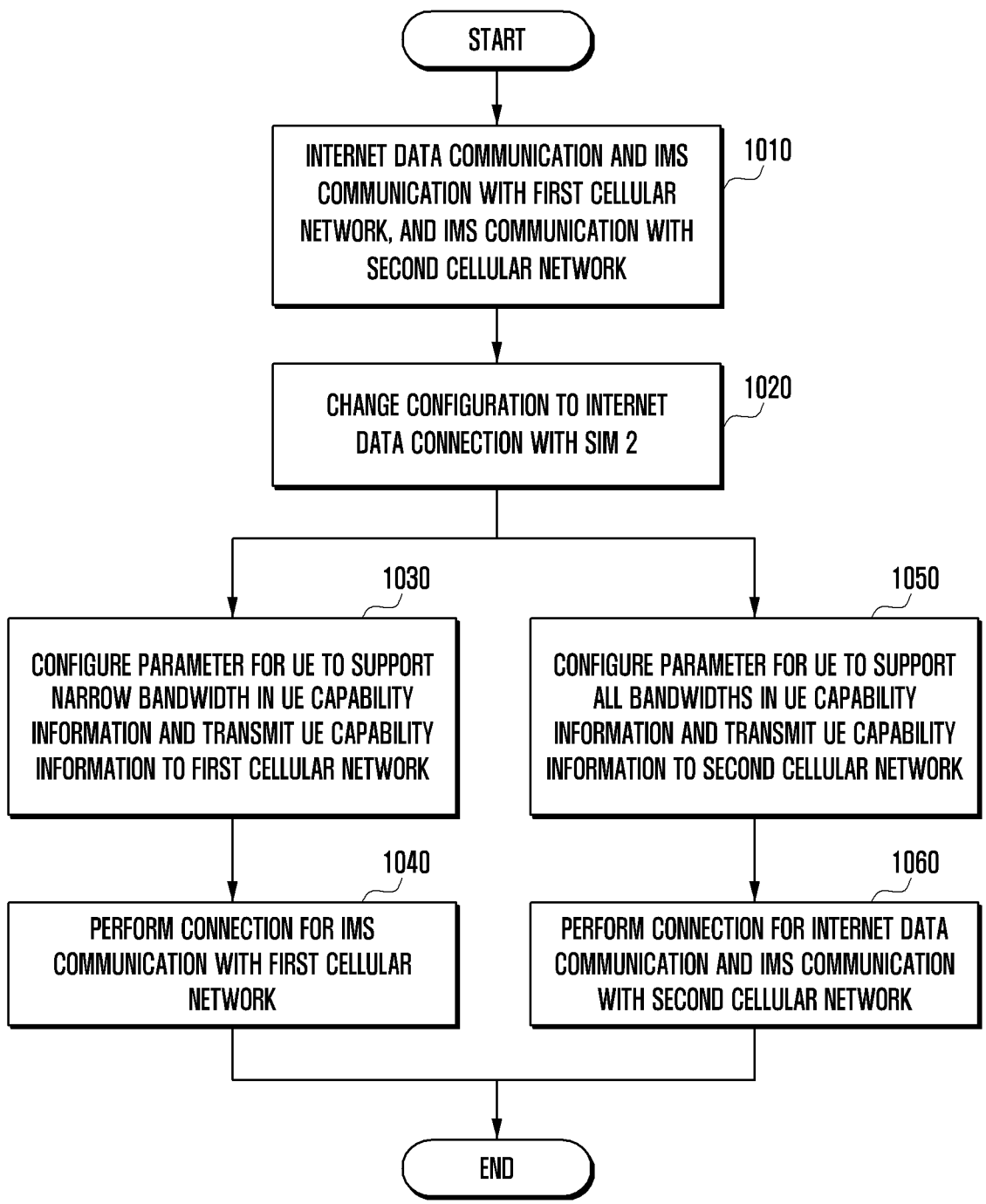
FIG. 10 is a flowchart illustrating a method in which a UE configures a bandwidth according to an embodiment of the disclosure.

FIG. 10 is a flowchart illustrating a method in which a UE configures a bandwidth according to an embodiment of the disclosure.

Referring to FIG. 10, the illustrated method may be performed by the foregoing UE (e.g., the UE 500 of FIG. 5) including a first subscriber identity module (e.g., the first subscriber identity module 512 of FIG. 5) supporting communication with a first cellular network and a second subscriber identity module (e.g., the second subscriber identity module 514 of FIG. 5) supporting communication with a second cellular network and may be performed by at least one of the application processor 532 and/or the communication processor 534.

According to various embodiments, in operation 1010, when establishment of Internet data communication via the first cellular network is configured, the UE 500 may perform Internet data communication and IMS communication with the first cellular network using the first subscriber identity module 512 and may perform IMS communication with the second cellular network using the second subscriber identity module 514 configured not to use Internet data communication.

According to various embodiments, in operation 1020, the UE 500 may detect an activity of triggering Internet data communication through the second cellular network while performing the Internet data communication with the first cellular network. Here, the activity may be, for example, an occasion in which a user configuration or communication with the second cellular network is changed to at least temporarily use data communication.

According to various embodiments, in operation 1030, the UE 500 may transmit UE capability information about the UE 500 in response to a request for UE capability information from the first cellular network. Here, to be allocated a narrow bandwidth, the UE 500 may configure a parameter for the UE to support a narrow bandwidth for the cellular network in the UE capability information. For example, the UE 500 may configure a bandwidth supported for each subcarrier spacing (SCS) to a bandwidth narrower than a currently supportable maximum bandwidth (or to the narrowest bandwidth) in a bandwidth part of the UE capability information and/or may configure a parameter indicating a supportable bandwidth to a parameter corresponding to the bandwidth narrower than the currently supportable maximum bandwidth (or to the narrowest bandwidth) in a downlink feature set and an uplink feature set of the UE capability information.

According to various embodiments, in operation 1040, the UE 500 may be allocated a narrow bandwidth from the first cellular network and may perform IMS communication.

According to various embodiments, in operation 1050, the UE 500 may transmit UE capability information including a parameter configured to support all bandwidths to the second cellular network.

According to various embodiments, in operation 1060, the UE 500 may be allocated a wide bandwidth from the second cellular network and may perform Internet data communication and IMS communication.

A UE according to various embodiments may include a first subscriber identity module configured to correspond to a first cellular network, a second subscriber identity module configured to correspond to a second cellular network, a wireless communication circuit, and a processor configured to be operatively connected to the first subscriber identity module, the second subscriber identity module, and the wireless communication circuit, wherein the processor may be configured to determine a subscriber identity module to be used for Internet data communication among the first subscriber identity module and the second subscriber identity module as the first subscriber identity module, to perform a connection process for Internet data communication and IP multimedia subsystem (IMS) communication for a voice call with the first cellular network through the wireless communication circuit using first identification information about the first subscriber identity module, and to perform a connection process for the IMS communication with the second cellular network through the wireless communication circuit using second identification information about the second subscriber identity module, the processor being configured to configure a parameter for the UE to support a narrow bandwidth for the second cellular network in UE capability information and to transmit the UE capability information to the second cellular network.

According to various embodiments, the processor may be configured to configure a bandwidth supported for each subcarrier spacing (SCS) to a bandwidth narrower than a currently supportable maximum bandwidth in a bandwidth part of the UE capability information.

According to various embodiments, the processor may be configured to configure only a lowest bit among bits corresponding to each bandwidth to 1 in channelBWs-DL and channelBWs-UL of the bandwidth part.

According to various embodiments, the processor may be configured not to include the bandwidth part or to include bandwidth part information configured as a default in the UE capability information transmitted to the first cellular network.

According to various embodiments, the processor may be configured to configure a parameter indicating a supportable bandwidth to a parameter corresponding to a narrowest bandwidth in a downlink feature set and an uplink feature set of the UE capability information.

According to various embodiments, the processor may be configured to configure a supportedBandwidthDL parameter of FeaturesetDownlinkPerCC of the UE capability information to a parameter corresponding to the narrowest bandwidth, and to configure a supportedBandwidthUL parameter of FeaturesetUplinkPerCC of the UE capability information to a parameter corresponding to a narrowest bandwidth.

According to various embodiments, the processor may be configured to detect an activity of triggering the Internet data communication through the second cellular network, and to perform a connection processor for the IMS communication by changing the UE capability information transmitted to the first cellular network such that a parameter for the UE to support a narrow band for the first cellular network is configured and transmitting the UE capability information to the first cellular network upon detecting the activity.

According to various embodiments, the UE may further include a battery, wherein the processor may be configured to identify a charging state of the battery when attempting a connection to the second cellular network, and to configure a parameter for supporting a narrow bandwidth in the UE capability information when the charging state of the battery is a predetermined level or less.

According to various embodiments, the first cellular network and the second cellular network may be 5G new radio (NR) standalone (SA) networks.

In a bandwidth configuration method of a UE according to various embodiments, the UE may include a first subscriber identity module corresponding to a first cellular network and a second subscriber identity module corresponding to a second cellular network, and the method may include determining a subscriber identity module to be used for Internet data communication among the first subscriber identity module and the second subscriber identity module as the first subscriber identity module, performing a connection process for Internet data communication and IP multimedia subsystem (IMS) communication for a voice call with the first cellular network through the wireless communication circuit using first identification information about the first subscriber identity module, and performing a connection process for the IMS communication with the second cellular network through the wireless communication circuit using second identification information about the second subscriber identity module, the method including configuring a parameter for the UE to support a narrow bandwidth for the second cellular network in UE capability information and transmitting the UE capability information to the second cellular network.

According to various embodiments, the configuring of the parameter for supporting the narrow bandwidth for the second cellular network may include configuring a bandwidth supported for each subcarrier spacing (SCS) to a bandwidth narrower than a currently supportable maximum bandwidth in a bandwidth part of the UE capability information.

According to various embodiments, the configuring of the supported bandwidth to the narrower bandwidth may include configuring only a lowest bit among bits corresponding to each bandwidth to 1 in channelBWs-DL and channelBWs-UL of the bandwidth part.

According to various embodiments, the method may further include not including the bandwidth part or including bandwidth part information configured as a default in the UE capability information transmitted to the first cellular network.

According to various embodiments, the configuring of the parameter for supporting the narrow bandwidth for the second cellular network may include configuring a parameter indicating a supportable bandwidth to a parameter corresponding to a narrowest bandwidth in a downlink feature set and an uplink feature set of the UE capability information.

According to various embodiments, the configuring of the parameter to the parameter corresponding to the narrowest bandwidth may include configuring a supportedBandwidthDL parameter of FeaturesetDownlinkPerCC of the UE capability information to a parameter corresponding to the narrowest bandwidth, and configuring a supportedBandwidthUL parameter of FeaturesetUplinkPerCC of the UE capability information to a parameter corresponding to a narrowest bandwidth.

According to various embodiments, further include detecting an activity of triggering the Internet data communication through the second cellular network, and performing a connection processor for the IMS communication by changing the UE capability information transmitted to the first cellular network such that a parameter for the UE to support a narrow band for the first cellular network is configured and transmitting the UE capability information to the first cellular network upon detecting the activity.

According to various embodiments, the method may further include identifying a charging state of a battery of the UE when attempting a connection to the second cellular network, wherein the configuring of the parameter for supporting the narrow bandwidth for the second cellular network may include configuring a parameter for supporting a narrow bandwidth in the UE capability information when the charging state of the battery is a predetermined level or less.

According to various embodiments, the first cellular network and the second cellular network may be 5G new radio (NR) standalone (SA) networks.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. A user equipment (UE) comprising:
   a first subscriber identity module includes first identification information corresponding to a first cellular network;
   a second subscriber identity module includes second identification information corresponding to a second cellular network;
   a wireless communication circuit; and a processor configured to be operatively connected to the first subscriber identity module, the second subscriber identity module, and the wireless communication circuit, wherein the processor is configured to:
determine a subscriber identity module to be used for Internet data communication among the first subscriber identity module and the second subscriber identity module as the first subscriber identity module, perform a connection process for Internet data communication and internet protocol (IP) multimedia subsystem (IMS) communication for a voice call with the first cellular network through the wireless communication circuit using the first identification information, and perform a connection process for the IMS communication with the second cellular network through the wireless communication circuit using the second identification information, the processor being configured to configure a parameter for the UE to support a narrow bandwidth for the second cellular network in UE capability information based on criteria and to transmit the UE capability information to the second cellular network.

2. The UE of claim 1, wherein the processor is further configured to configure a bandwidth supported for each subcarrier spacing (SCS) to a bandwidth narrower than a currently supportable maximum bandwidth in a bandwidth part of the UE capability information.

3. The UE of claim 2, wherein the processor is further configured to configure only a lowest bit among bits corresponding to each bandwidth to 1 in channelBWs-DL and channelBWs-UL of the bandwidth part.

4. The UE of claim 2, wherein the processor is further configured not to include the bandwidth part or to include bandwidth part information configured as a default in the UE capability information transmitted to the first cellular network.

5. The UE of claim 1, wherein the processor is further configured to configure a parameter indicating a supportable bandwidth to a parameter corresponding to a narrowest bandwidth in a downlink feature set and an uplink feature set of the UE capability information.

6. The UE of claim 5, wherein the processor is further configured to:
configure a supportedBandwidthDL parameter of FeaturesetDownlinkPerCC of the UE capability information to a parameter corresponding to the narrowest bandwidth, and
configure a supportedBandwidthUL parameter of FeaturesetUplinkPerCC of the UE capability information to a parameter corresponding to a narrowest bandwidth.

7. The UE of claim 1, wherein the processor is further configured to:
detect an activity of triggering the Internet data communication through the second cellular network, and
upon detecting the activity, perform a connection process for the IMS communication by changing the UE capability information transmitted to the first cellular network such that a parameter for the UE to support a narrow band for the first cellular network is configured and transmitting the UE capability information to the first cellular network.

8. The UE of claim 1, further comprising a battery, wherein the criteria comprise a charging state of a battery of the UE, and wherein the processor is further configured to:
identify a charging state of the battery when attempting a connection to the second cellular network, and
configure the parameter for supporting a narrow bandwidth in the UE capability information when the charging state of the battery is a predetermined level or less.

9. The UE of claim 1, wherein the first cellular network and the second cellular network are 5G new radio (NR) standalone (SA) networks.

10. A bandwidth configuration method of a user equipment (UE), the UE comprising:
a first subscriber identity module including first identification information corresponding to a first cellular network, and
a second subscriber identity module including second identification information corresponding to a second cellular network, the method comprising:
determining a subscriber identity module to be used for Internet data communication among the first subscriber identity module and the second subscriber identity module as the first subscriber identity module, performing a connection process for Internet data communication and internet protocol (IP) multimedia subsystem (IMS) communication for a voice call with the first cellular network using the first identification information, and performing a connection process for the IMS communication with the second cellular network using the second identification information, the method comprising configuring a parameter for the UE to support a narrow bandwidth for the second cellular network in UE capability information based on criteria and transmitting the UE capability information to the second cellular network.

11. The method of claim 10, wherein the configuring of the parameter for supporting the narrow bandwidth for the second cellular network comprises configuring a bandwidth supported for each subcarrier spacing (SCS) to a bandwidth narrower than a currently supportable maximum bandwidth in a bandwidth part of the UE capability information.

12. The method of claim 11, wherein the configuring of the supported bandwidth to the narrower bandwidth comprises configuring only a lowest bit among bits corresponding to each bandwidth to 1 in channelBWs-DL and channelBWs-UL of the bandwidth part.

13. The method of claim 11, further comprising not including the bandwidth part or including bandwidth part information configured as a default in the UE capability information transmitted to the first cellular network.

14. The method of claim 10, wherein the configuring of the parameter for supporting the narrow bandwidth for the second cellular network comprises configuring a parameter indicating a supportable bandwidth to a parameter corresponding to a narrowest bandwidth in a downlink feature set and an uplink feature set of the UE capability information.

15. The method of claim 14, wherein the configuring of the parameter to the parameter corresponding to the narrowest bandwidth comprises:
configuring a supportedBandwidthDL parameter of FeaturesetDownlinkPerCC of the UE capability information to a parameter corresponding to the narrowest bandwidth; and configuring a supportedBandwidthUL parameter of FeaturesetUplinkPerCC of the UE capability information to a parameter corresponding to a narrowest bandwidth.

16. The method of claim 10, further comprising:
detecting an activity of triggering the Internet data communication through the second cellular network; and
upon detecting the activity, performing a connection process for the IMS communication by changing the UE capability information transmitted to the first cellular network such that a parameter for the UE to support a narrow band for the first cellular network is configured and transmitting the UE capability information to the first cellular network.

17. The method of claim 16, further comprising:
upon detecting the activity, performing a connection process with the second cellular network by changing the UE capability information transmitted to the second cellular network such that a parameter for the UE to support an original band for the second cellular network is configured and transmitting the UE capability information to the second cellular network.

18. The method of claim 10,
wherein the criteria comprise a charging state of a battery of the UE, and
wherein the method further comprises:
identifying a charging state of a battery of the UE when attempting a connection to the second cellular network; and
configuring the parameter for supporting a narrow bandwidth in the UE capability information when the charging state of the battery is a predetermined level or less.

19. The method of claim 18, further comprising:
configuring the parameter for supporting an original bandwidth in the UE capability information when the charging state of the battery is more than the predetermined level.

20. The method of claim 10, wherein the first cellular network and the second cellular network are 5G new radio (NR) standalone (SA) networks.

* * * * *